(12) United States Patent
Kashihara (10) Patent No.: US 11,451,063 B2
(45) Date of Patent: Sep. 20, 2022

(54) POWER SUPPLY SYSTEM (71) Applicant: NISSIN ELECTRIC CO., LTD., Kyoto (JP)

(72) Inventor: Hironori Kashihara, Kyoto (JP)

(73) Assignee: NISSIN ELECTRIC CO., LTD., Kyoto (JP)

( * ) Notice: Subject to any disclaimer, the term of this patent is extended or adjusted under 35 U.S.C. 154(b) by 0 days.

(21) Appl. No.: 17/263,159

(22) PCT Filed: Jun. 21, 2019

(86) PCT No.: PCT/JP2019/024661
§ 371 (c)(1),
(2) Date: Jan. 26, 2021

(87) PCT Pub. No.: WO2020/021925
PCT Pub. Date: Jan. 30, 2020

(65) Prior Publication Data
US 2021/0167605 A1    Jun. 3, 2021

(30) Foreign Application Priority Data
Jul. 27, 2018 (JP) .............................. JP2018-141122

(51) Int. Cl.
*H02J 3/38* (2006.01)
*H02J 3/00* (2006.01)
*H02J 3/46* (2006.01)

(52) U.S. Cl.
CPC ............ *H02J 3/381* (2013.01); *H02J 3/0012* (2020.01); *H02J 3/46* (2013.01); *H02J 2300/22* (2020.01)

(58) Field of Classification Search
CPC .. H02J 3/381; H02J 3/382; H02J 3/383; H02J 3/0012; H02J 3/46; H02J 2300/22; H02J 2300/24
(Continued)

(56) References Cited

FOREIGN PATENT DOCUMENTS

| CN | 103580066 | 2/2014 |
|---|---|---|
| JP | 3402886 | 5/2003 |

(Continued)

OTHER PUBLICATIONS

Japanese patent publication JP 2019047656 A (JP 6338131 B1) to Uda et al., English translation, Jun. 6, 2018, from https://worldwide.espacenet.com, visited Feb. 11, 2022. (Year: 2018).*

(Continued)

*Primary Examiner* — Hal Kaplan
(74) *Attorney, Agent, or Firm* — JCIRPNET (57) ABSTRACT

A power supply system includes a distributed power supply, an opening/closing switch, an impedance element, a system abnormality detection part, and a switch control part. The distributed power supply is connected to a power line for supplying power to an important load from a commercial power system. The opening/closing switch is provided on a commercial power system side of the distributed power supply. The impedance element is connected in parallel to the opening/closing switch. The system abnormality detection part detects an abnormality of the commercial power system. The switch control part opens the opening/closing switch and connects the distributed power supply and the commercial power system via the impedance element when an abnormality of the commercial rower system is detected. When the distributed power supply and the commercial power system are connected via the impedance element, the distributed power supply continues an operation including a reverse power flow.

6 Claims, 7 Drawing Sheets

(58) Field of Classification Search
USPC .......................................................... 307/52
See application file for complete search history.

(56) References Cited

FOREIGN PATENT DOCUMENTS

| JP | 2016226279 | 12/2016 |
| JP | 2017070130 | 4/2017 |
| JP | 6338131 | 6/2018 |

OTHER PUBLICATIONS

Japanese patent publication JP 2017070130 A to Tagome, English translation, Apr. 6, 2017, from https://worldwide.espacnet.com, visited Feb. 11, 2022. (Year: 2017).*
"International Search Report (Form PCT/ISA/210) of PCT/JP2019/024661," dated Aug. 20, 2019, with English translation thereof, pp. 1-4.
"Office Action of India Counterpart Application", dated Jun. 30, 2021, p. 1-p. 6.
"Office Action of Australia Counterpart Application", dated Aug. 13, 2021, p. 1-p. 4.
Upama Bose et al., "A Novel Method of Frequency Regulation in Microgrid," 2016 IEEE 7th Power India International Conference (PIICON), Nov. 2016, pp. 1-6.
"Search Report of Europe Counterpart Application", dated Mar. 1, 2022, p. 1-p. 8.

* cited by examiner

POWER SUPPLY SYSTEM

CROSS-REFERENCE TO RELATED APPLICATION

This application is a 371 application of the International PCT application serial no. PCT/JP2019/024661, filed on Jun. 21, 2019, which claims the priority benefits of Japan Patent Application No. 2018-141122, filed on Jul. 27, 2018. The entirety of each of the above-mentioned patent applications is hereby incorporated by reference herein and made a part of this specification.

BACKGROUND

Technical Field

The disclosure relates to a power supply system.

Description of Related Art

In recent years, due to the high performance of a storage battery, especially in a large-capacity (500 kW capacity class or higher) storage battery system, realization of both an uninterruptible power supply function and a load leveling function is being considered. For example, as shown in Patent Document 1, a secondary battery system achieving both an uninterruptible power supply function and a load leveling function has been considered. This system is configured to supply power to an important load through disconnection with respect to a power failure or an instantaneous voltage drop.

However, as distributed power supplies interconnected with commercial power systems increase, if these distributed power supplies are disconnected all at once at the time of an instantaneous voltage drop, it may have a great impact on the maintenance of the voltage and the frequency of the entire commercial power system. For this reason, it is required to continuously operate the distributed power supplies without disconnecting them from the commercial power system even at the time of an instantaneous voltage drop (i.e., fault ride through (FRT) requirements).

RELATED ART

Patent Document(s)

Patent Document 1: Japanese Patent No. 3402886

SUMMARY

Problems to be Solved

On the other hand, the inventor of the present application, in a manner as shown in Patent Document 1, continues the development of a power supply system having a configuration in which an opening/closing switch is provided on a commercial power system side of a distributed power supply on a power line, and meanwhile, an impedance element is connected in parallel to the opening/closing switch. In this power supply system, at the time of a system abnormality, the opening/closing switch is opened to connect the distributed power supply with the commercial power system via the impedance element. Herein, a generator, a power storage device, a solar power generation device, and the like may be used as the distributed power supply.

However, in the above power supply system, when an important load fluctuates at the time of a system abnormality, due to the inertial force of the generator, the generator cannot catch up with the fluctuation and thus drops out. In addition, when a solar power generation device is connected as a distributed power supply, the generator will drop out for the same reason due to output fluctuation of the solar power generation device. As a result, there is an issue that it is difficult to stably supply power to an important load at the time of a system abnormality.

Therefore, the disclosure has been made to solve the above issues, and its main objective is to stably supply power to an important load even at the time of a system abnormality while satisfying the FRT requirements.

Means for Solving the Problems

Namely, a power supply system of the disclosure includes a distributed power supply, an opening/closing switch, an impedance element, a system abnormality detection part, and a switch control part. The distributed power supply is connected to a power line for supplying power to an important load from a commercial power system. The opening/closing switch is provided on a commercial power system side of the distributed power supply on the power line. The impedance element is connected in parallel to the opening/closing switch on the power line. The system abnormality detection part detects an abnormality of the commercial power system. The switch control part opens the opening/closing switch and connects the distributed power supply and the commercial power system via the impedance element when an abnormality of the commercial power system is detected. In a state where the distributed power supply and the commercial power system are connected via the impedance element, the distributed power supply continues an operation including a reverse power flow. The distributed power supply includes a rotary power generation device connected to the power line and an energy storage device connected to the power line. The energy storage device includes an energy storage part, a bi-directional power converter, and a convertor control part. The bi-directional power converter performs charging and discharging of the energy storage part. The convertor control part controls the bi-directional power converter to perform an operation simulating an inertial force of the rotary power generation device.

With such a power supply system, the opening/closing switch is provided on the commercial power system side of the distributed power supply on the power line, and meanwhile, the impedance element is connected in parallel to the opening/closing switch, and the opening/closing switch is opened when an abnormality of the commercial power system is detected. Therefore, at the time of a system abnormality, the distributed power supply becomes interconnected with the commercial power system via the impedance element. Accordingly, while satisfying the FRT requirements of the distributed power supply, it is possible to prevent a voltage drop to the important load at the time of a system abnormality. As a result, while satisfying the FRT requirements, it is possible to achieve both the uninterruptible power supply function and the load leveling function by using the common distributed power supply Herein, since it is only necessary to provide a parallel circuit part of the impedance element and the opening/closing switch on the power line, the circuit configuration of the device can be simplified, and meanwhile, since the current flows through the opening/closing switch at the time of normal operation, the loss caused in the impedance element such as a reactor can be eliminated.

In particular, in the disclosure, in the energy storage device used as the distributed power supply, since the bi-directional power converter of the energy storage device is controlled to perform an operation simulating the inertial force of the rotary power generation device, the inertial force of the rotary power generation device can be compensated for. Therefore, it is possible to prevent the generator from dropping out with respect to the fluctuation of the important load. As a result, it is possible to stably supply power to the important load even at the time of a system abnormality.

It may be considered that the distributed power supply has a solar power generation device including a solar power generation panel and a power converter. In that case, the factors for the dropout of the rotary power generation device include not only the fluctuation of the important load but also the output fluctuation of the solar power generation device. In the disclosure, since the energy storage device performs an operation simulating the inertial force of the rotary power generation device, even when the output of the solar power generation device fluctuates, it is possible to stably supply power to the important load.

It is desired that the converter control part performs current control on the bi-directional power converter when the commercial power system is normal, and performs voltage control on the bi-directional power converter when the commercial power system is abnormal. On the other hand, if the converter control part constantly performs voltage control on the bi-directional power converter, it is possible to stably supply power to the important load even when the operation of the rotary power generation device is stopped.

Effects

According to the disclosure configured in this manner, while satisfying the FRT requirements, it is possible to stably supply power to an important load even at the time of a system abnormality.

DESCRIPTION OF THE EMBODIMENTS

Hereinafter, an embodiment of a power supply system according to the disclosure will be described with reference to the drawings.

Figure 1:
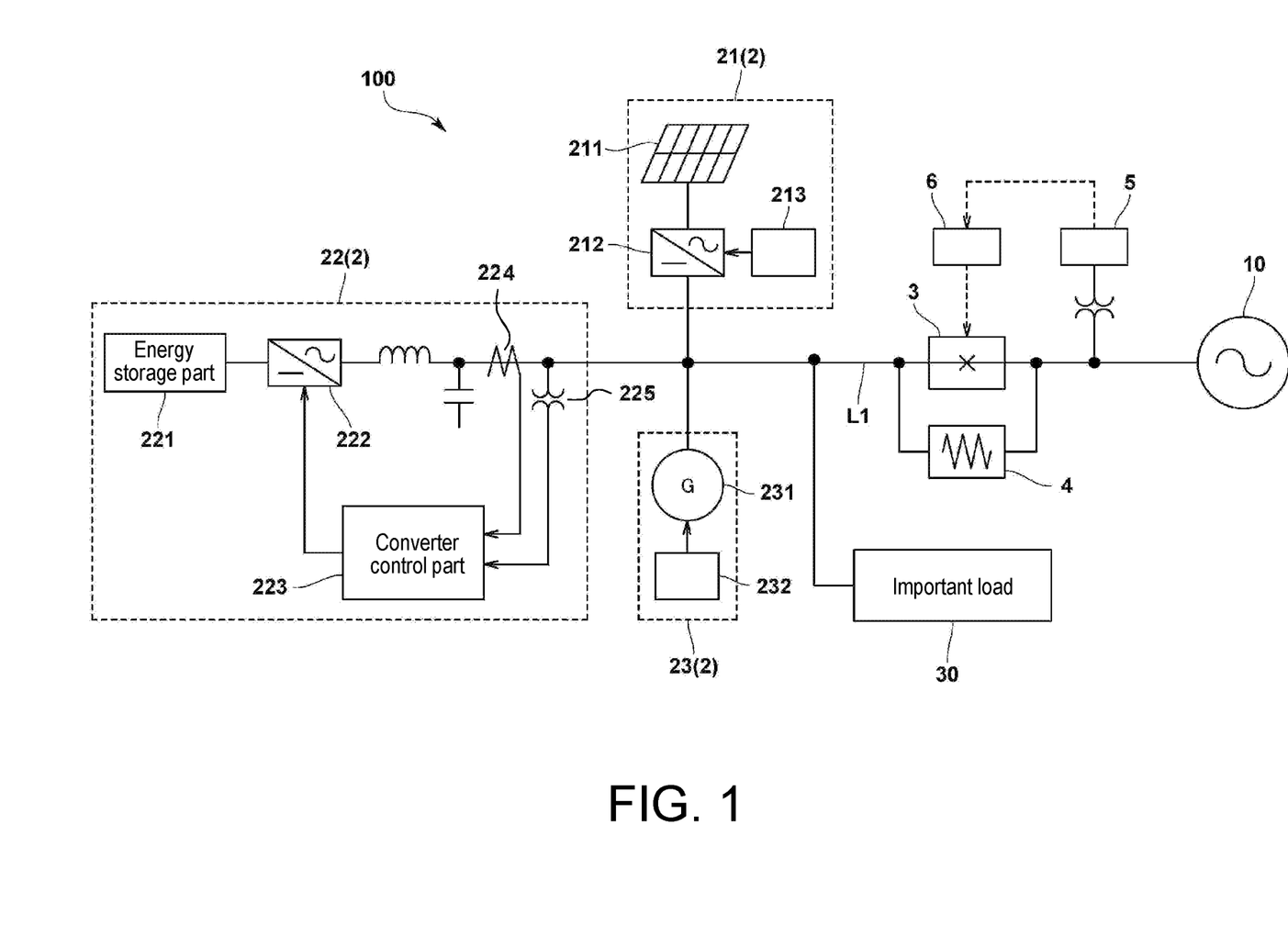
FIG. 1 is a schematic view showing a configuration of a power supply system according to this embodiment.

As shown in FIG. 1, a power supply system 100 of this embodiment is provided between a commercial power system 10 and an important load 30, and exerts a function as an uninterruptible power supply system (i.e., an uninterruptible power supply function) which supplies power to the important load 30 at the time of an abnormality of the commercial power system 10, and a function as a distributed power supply system (i.e., a load leveling function) which levels the load by forwarding and reversing power flow with respect to the commercial power system.

Herein, the commercial power system 10 is a power supply network of an electric power company (electric power supplier) and has a power plant, a power transmission system, and a power distribution system. Further, the important load 30 is a load which should be stably supply power even at the time of a system abnormality such as a power failure or an instantaneous voltage drop, and although it is shown as one in FIG. 1, it may also be plural.

Specifically, the power supply system 100 includes a distributed power supply 2, an opening/closing switch 3 which connects the commercial power system 10 with the distributed power supply 2 and the important load 30, an impedance element 4 connected in parallel to the opening/closing switch 3, a system abnormality detection part 5 which detects an abnormality (hereinafter referred to as a system abnormality) on the commercial power system 10 side of the opening/closing switch 3, and a switch control part 6 which opens the opening/closing switch 3 when a system abnormality is detected.

The distributed power supply 2 is connected to a power line L1 for supplying power from the commercial power system 10 to the important load 30. In this embodiment, a solar power generation device 21, an energy storage device 22 such as a secondary battery (storage battery), and a rotary power generation device 23 having a synchronous generator or the like are provided as the distributed power supply 2. Each of these distributed power supplies 2 is interconnected with the commercial power system 10.

The solar power generation device 21 includes a solar power generation panel 211, a power converter 212, and a converter control part 213 which controls the current of the power converter 212. In addition, the rotary power generation device 23 includes a synchronous generator 231 and a control part 232 which performs droop control on the synchronous generator 231. The energy storage device 22 will be described later.

The opening/closing switch 3 is provided on the commercial power system 10 side of the connection point of the distributed power supply 2 on the power line L1 to open and close the power line L1, and may be, for example, an opening/closing switch capable of high-speed switching such as a semiconductor switch or a hybrid switch in which a semiconductor switch and a mechanical switch are combined. For example, when a semiconductor switch is used, the switching time may be set to 2 milliseconds or less, and the switch may be cut off regardless of the zero point. Further, when a hybrid switch is used, the switching time may be set to 2 milliseconds or less, and not only may the switch be cut off regardless of the zero point, but the conduction loss may also be set to zero. The opening/closing switch 3 is controlled to open and close by the switch control part 6.

The impedance element 4 is connected in parallel to the opening/closing switch 3 on the power line L1 and is a current limiting reactor in this embodiment.

In this embodiment, the system abnormality detection part 5 detects a voltage drop including an instantaneous drop in the system voltage of the commercial power system. Specifically, the system abnormality detection part 5 detects the voltage on the commercial power system 10 side of the opening/closing switch 3 on the power line L1 to detect a voltage drop by comparing the detected voltage with a predetermined set value. Herein, the set value for detecting the voltage drop is a voltage value for detecting an instantaneous voltage drop and may be, for example, a residual voltage of 20%.

The switch control part 6 outputs a control signal to the opening/closing switch 3 based on a detection signal detected by the system abnormality detection part 5 to open the opening/closing switch 3. With the switch control part 6 opening the opening/closing switch 3 in this manner, the commercial power system 10, and the distributed power supply 2 and the important load 30 become connected to each other via the impedance element 4. In this state, the distributed power supply 2 continues the operation including the reverse power flow.

Then, as shown in FIG. 1, the energy storage device 22 of this embodiment includes a storage battery 221 such as a secondary battery which is an energy storage part, a bi-directional power converter 222 which performs charging and discharging of the storage battery 221, and a converter control part 223 which controls the bi-directional power converter 222. The bi-directional power converter 222 is an inverter circuit configured by using a semiconductor switch element.

The convertor control part 223 controls the voltage of the bi-directional power converter 222 at the time of a system abnormality to perform an operation simulating an inertial force of the synchronous generator 231. Specifically, the convertor control part 223 performs virtual synchronous generator (VSG) control which causes the energy storage device 22 to have the characteristics of the synchronous generator 231. While the switch control part 6 opens the opening/closing switch 3, the convertor control part 223 of this embodiment controls the bi-directional power converter 222 so that the energy storage device 22 serves as a voltage source having an inertial force and keeps the load voltage and its frequency constant. A reference numeral 224 in FIG. 1 is a current measuring instrument for measuring the output current of the energy storage device 22, and a reference numeral 225 is a voltage measuring instrument for measuring the output voltage of the energy storage device 22. These measured values are acquired by the convertor control part 223 and are also used in the control of the bi-directional power converter 222.

Herein, when the system is normal, the converter control part 223 performs droop control (a voltage amplitude V and a frequency f are variable) on the bi-directional power converter 222 so that the energy storage device 22 becomes a voltage source having an inertial force.

On the other hand, when a system abnormality is detected by the system abnormality detection part 5, the converter control part 223 shifts from droop control to command value control (the voltage amplitude V and the frequency f are fixed) while having the energy storage device 22 maintain the inertial force.

Herein, the reason for performing the command value control lies in that if the system fault is eliminated immediately, the distributed power supply returns to the original output with respect to the commercial power system within a certain period of time (e.g., 0.1 to 1.0 second) according to the FRT requirements. In other words, the reason lies in that the opening/closing switch 3 is quickly turned on again after the system recovery.

Although the current flow between the system and the distributed power supply is temporarily suppressed by the insertion of the impedance element 4, if the phase shifts between the system and the distributed power supply during impedance insertion, an overcurrent will occur the moment when the opening/closing switch 3 is turned on even if the voltage amplitude is restored. In particular, in droop control, the voltage amplitude V and the frequency f are variable, and the above phase shift is likely to occur.

Therefore, in order to match the system voltage with the voltage amplitude and the phase to turn on the opening/closing switch 3 as soon as possible after the power recovery is detected, when a system abnormality is detected, the energy storage device 22 is shifted to the command value control to control the voltage amplitude V and the frequency f on the distributed power supply side to remain at the values immediately before the fault occurrence, so that the phase shift between the system and the distributed power supply can be minimized, and the synchronization time can be shortened. In the case of a power failure, the droop control is returned to with the opening/closing switch 3 left open.

Figure 2:
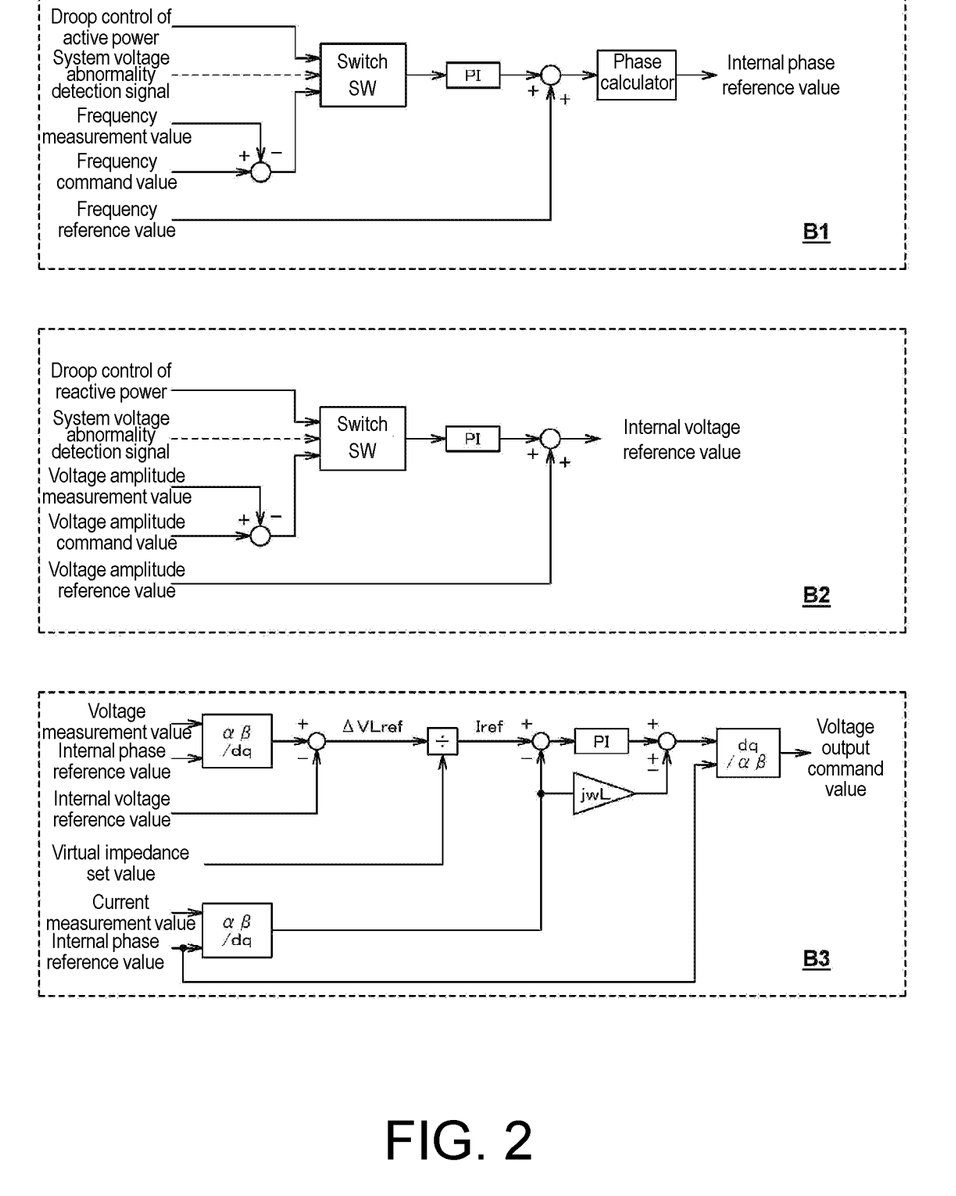
FIG. 2 is a control block diagram of a converter control part of the same embodiment.

Specifically, the converter control part 223 calculates a voltage output command value of the bi-directional power converter 222 based on the control block diagram shown in FIG. 2 to control the bi-directional power converter 222. More specifically, the converter control part 223 includes a first control block B1 which calculates an internal phase reference value, a second control block B2 which calculates an internal voltage reference value, and a third control block B3 which calculates the voltage output command value by using the calculated internal phase reference value and internal voltage reference value, and a virtual impedance set value for simulating the inertial force of the synchronous generator 231.

The first control block B1 acquires a system voltage abnormality detection signal and switches between the droop control of an active power and the feedback control with respect to a frequency command value to calculate the internal phase reference value. Further, the second control block B2 acquires a system voltage abnormality detection signal and switches between the droop control of a reactive power and the feedback control with respect to a voltage amplitude command value to calculate the internal voltage reference value. The third control block B3 calculates the voltage output command value by using the calculated internal phase reference value and internal voltage reference value, the voltage measurement value, the current measurement value, and the virtual impedance set value. The converter control part 223 controls the bi-directional power converter 222 by using this voltage output command value.

Next, the operations (at the normal time and at the time of an instantaneous voltage drop) of the power supply system 100 of this embodiment will be described.

Figure 3:
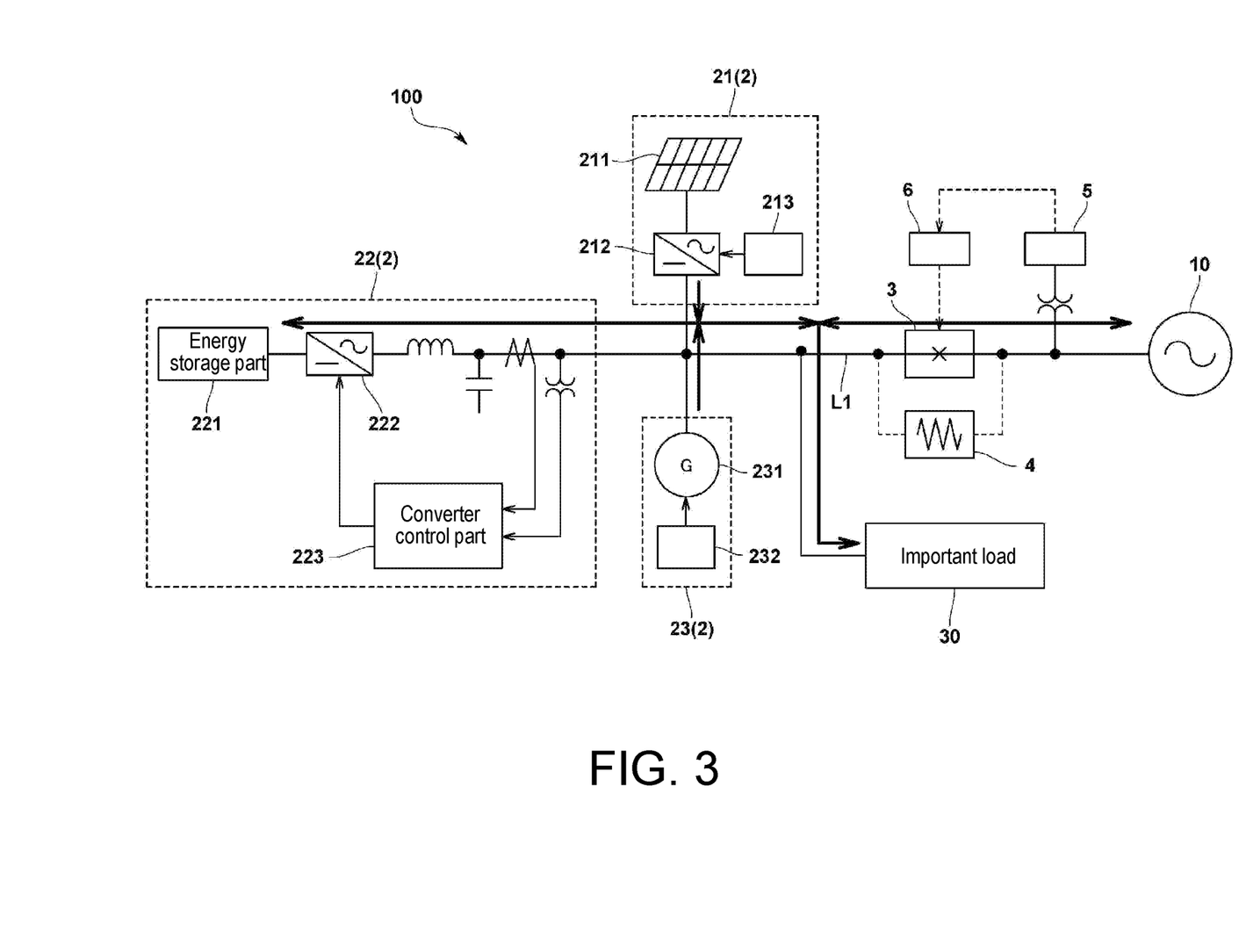
FIG. 3 is a schematic view showing a state of the power supply system in the normal time in the same embodiment.

As shown in FIG. 3, the power supply system 100 is normally in the state where the opening/closing switch 3 is closed, and the distributed power supply 2 and the important load 30 are connected to the commercial power system 10 via the opening/closing switch 3. Although the reactor 4 is connected in parallel to the opening/closing switch 3, since the impedance of opening/closing switch 3 is smaller than the impedance of the reactor 4, power is exchanged between the commercial power system 10, and the distributed power supply 2 and the important load 30 on the opening/closing switch 3 side. Peak-cut and peak-shift can be realized by the reverse power flow by the distributed power supply 2.

On the other hand, if a short-circuit fault (e.g., a three-phase short circuit) occurs on the commercial power system 10 side, the voltage on the commercial power system 10 side drops. This voltage drop is detected by the system abnormality detection part 5. The switch control part 6 opens the opening/closing switch 3 when a system abnormality is detected.

Figure 4:
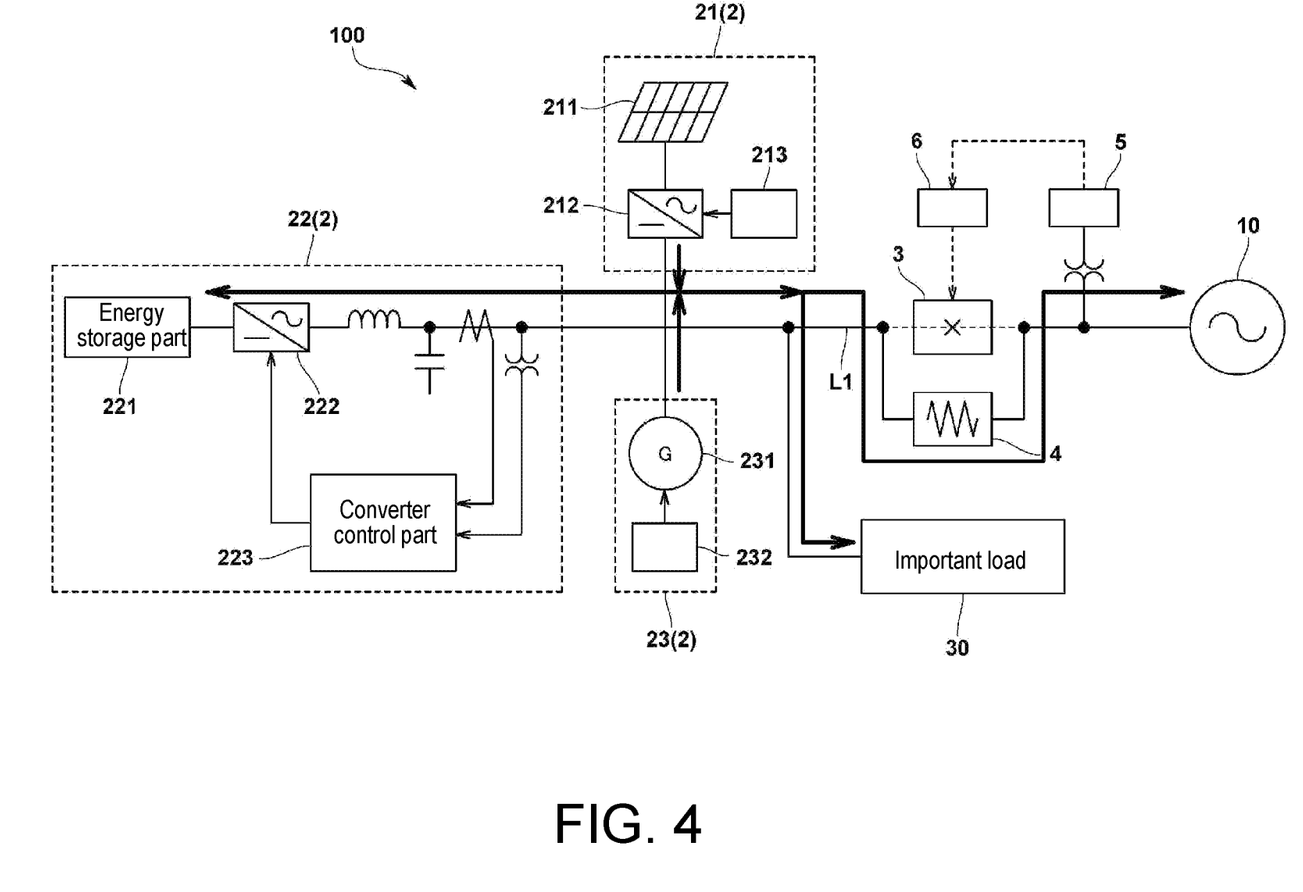
FIG. 4 is a schematic view showing a state of the power supply system at the time of an instantaneous voltage drop in the same embodiment.

As shown in FIG. 4, when the opening/closing switch 3 is opened, the distributed power supply 2 and the important load 30 become connected to the commercial power system 10 via the reactor 4. In this state, the current flowing from the distributed power supply 2 to the short-circuit fault point is limited by the reactor 4, and as the fault current flowing to the short-circuit fault point is suppressed, the voltage drop of the important load 30 is prevented. Further, in this state, the distributed power supply 2 continues the operation including the reverse power flow and continues the power generation output.

Also, while the opening/closing switch 3 is opened, the converter control part 223 of the energy storage device 22 controls the bi-directional power converter 222 so that the energy storage device 22 serves as a voltage source having an inertial force and keeps the load voltage and its frequency constant.

In addition, the system abnormality detection part 5 detects the voltage on the commercial power system 10 side regardless of the opening/closing of the opening/closing switch 3, and the switch control part 6 closes the opening/closing switch 3 when the detected voltage becomes equal to or higher than a predetermined recovery voltage (e.g., when the residual voltage of the commercial power system becomes 80% or more).

Figure 5:
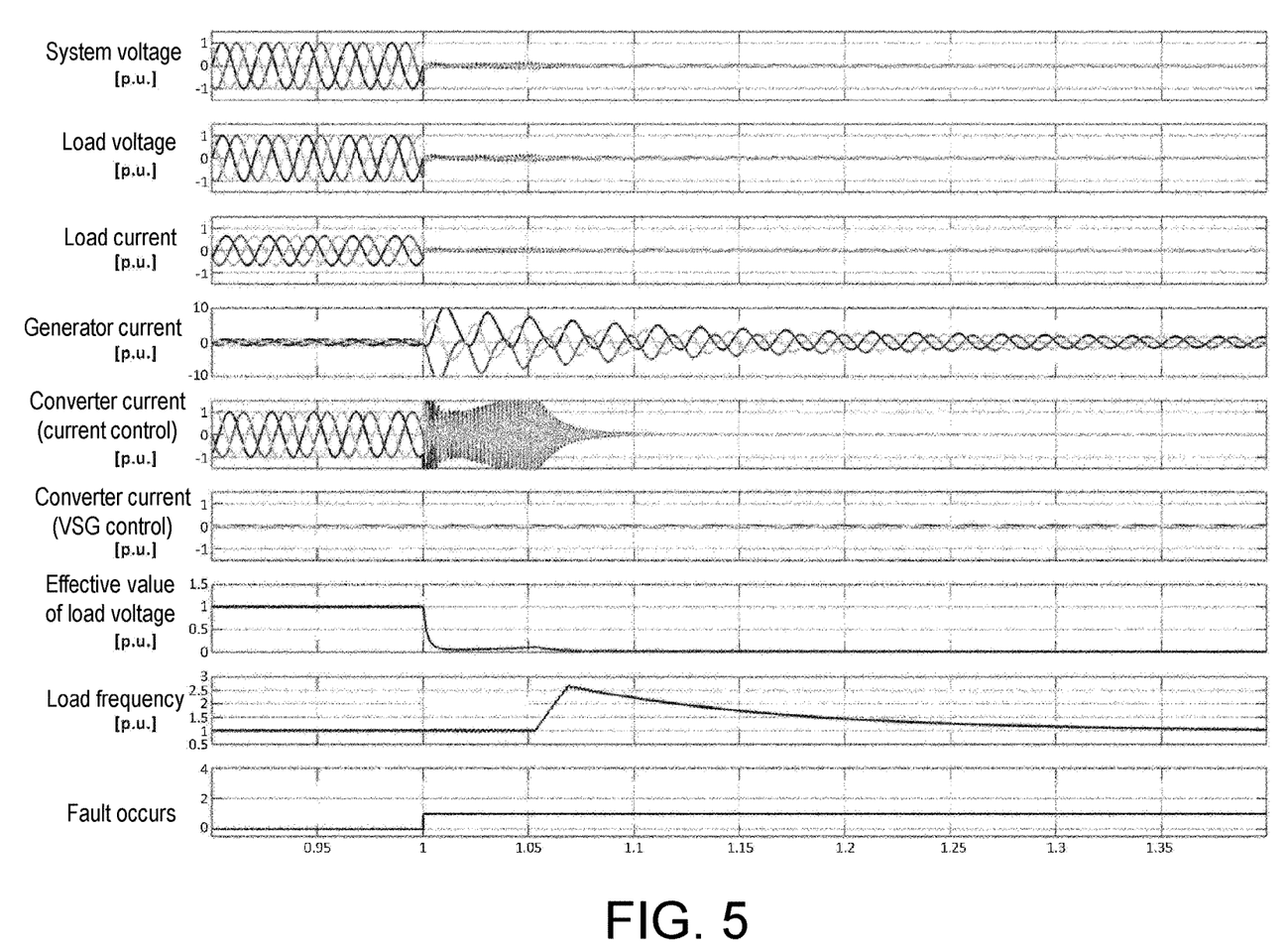
FIG. 5 shows each current value and voltage value before and after an instantaneous voltage drop in the case where inertial force control is not performed in a power supply system n which an impedance element is not inserted.
Figure 6:
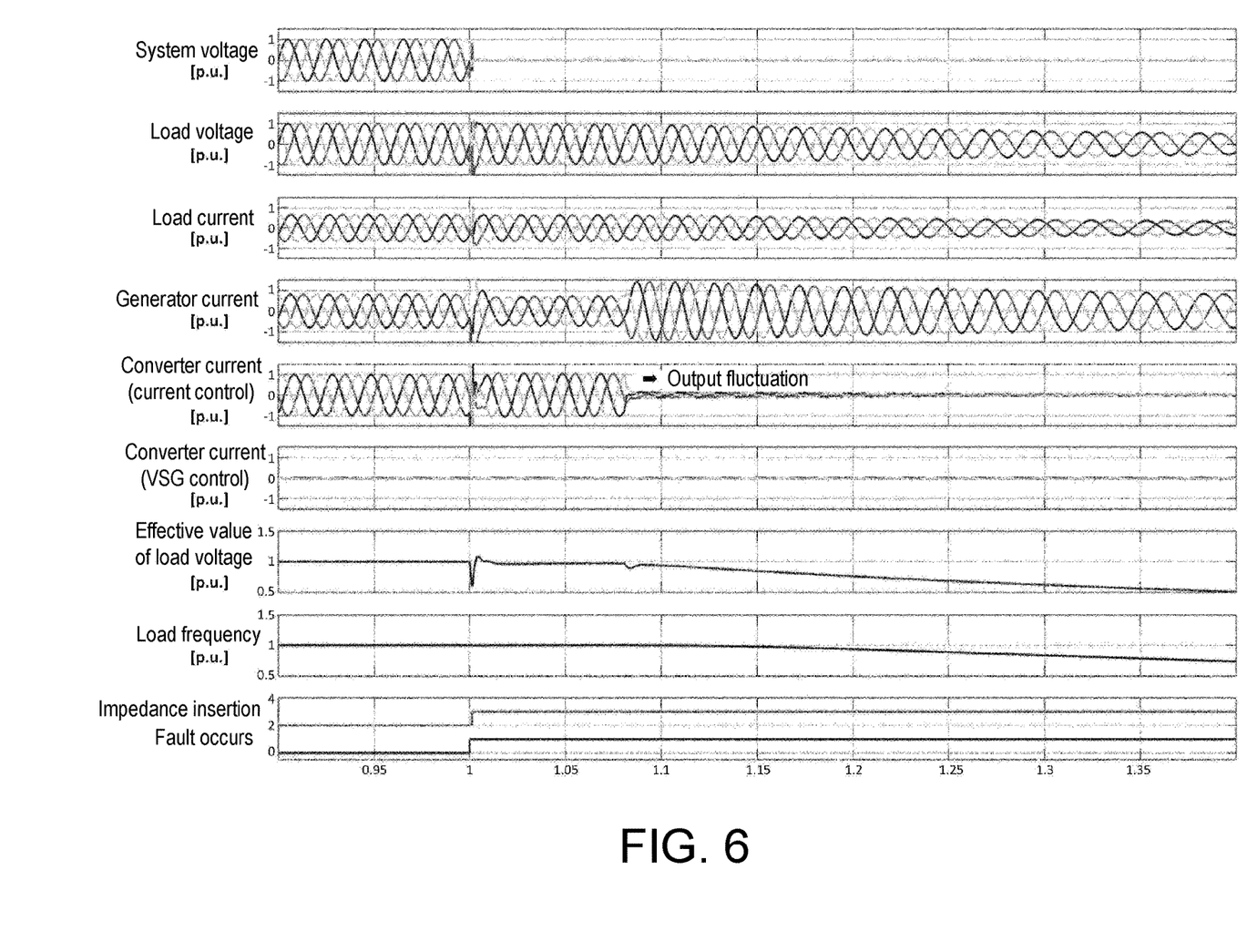
FIG. 6 shows each current value and voltage value before and after an instantaneous voltage drop in the case where inertial force control is not performed in a power supply system in which an impedance element is inserted.
Figure 7:
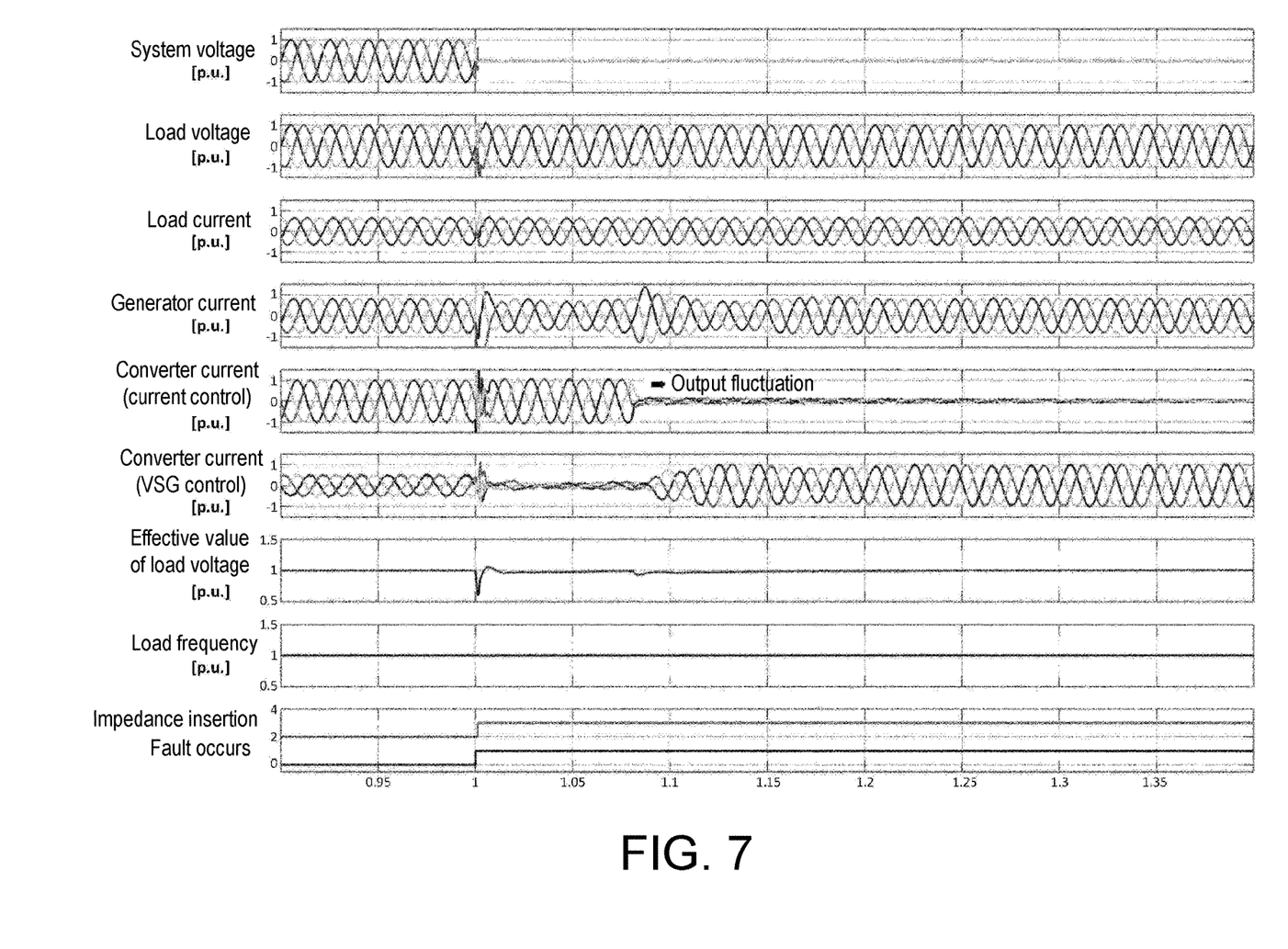
FIG. 7 shows each current value and voltage value before and after an instantaneous voltage drop in the case where inertial force control is performed in a power supply system in which an impedance element is inserted.

Next, FIG. 5 to FIG. 7 show simulation results of compensation operations by the power supply system when an instantaneous voltage drop occurs.

FIG. 5 is a graph showing each current value and voltage value before and after an instantaneous voltage drop in the case where VSG control is not performed in a power supply system in which an impedance element is not inserted. FIG. 6 is a graph showing each current value and voltage value before and after an instantaneous voltage drop in the case where VSG control is not performed in a power supply system in which an impedance element is inserted. FIG. 7 is a graph showing each current value and voltage value before and after an instantaneous voltage drop in the case where VSG control is performed in a power supply system which an impedance element is inserted.

As shown in FIG. 6, in the case where current control is performed on the bi-directional power converter 222 of the energy storage device 22 without performing VSG control, when the output of the solar power generation device 21 fluctuates, the generator current fluctuates, and the effective value of the load voltage and the load frequency decrease. On the other hand, as shown in FIG. 7, in the case where the bi-directional power converter of the energy storage device 22 is VSG-controlled, even if the output of the solar power generation device fluctuates, the effective value of the load voltage and the frequency will be constant.

According to the power supply system 100 of this embodiment configured in this manner, the opening/closing switch 3 is provided on the commercial power system 10 side of the distributed power supply 2 on the power line L1, and meanwhile, the reactor 4 is connected in parallel to the opening/closing switch 3, and the opening/closing switch 3 is opened when the voltage on the commercial power system 10 side becomes equal to or less than the set value. Therefore, at the time of an instantaneous voltage drop, the distributed power supply 2 and the important load 30 also become connected to the commercial power system 10 via the reactor 4. Accordingly, since the power supply system 100 does not disconnect the distributed power supply 2 and the important load 30 from the commercial power system 10 at the normal time and at the time of an instantaneous voltage drop, while satisfying the FRI requirements of the distributed power supply 2, it is possible to prevent a voltage drop to the important load 30 at the time of an instantaneous voltage drop. As a result, while satisfying the FRT requirements, it is possible to achieve both the uninterruptible power supply function and the load leveling function by using the common distributed power supply 2. Herein, since it is only necessary to provide a parallel circuit part of the reactor 4 and the opening/closing switch 3 on the power line L1, the circuit configuration of the device can be simplified, and meanwhile, since the current flows through the opening/closing switch 3 at the time of normal operation, the loss caused in the reactor 4 can be eliminated.

In particular, in this embodiment, in the energy storage device 22 used as the distributed power supply 2, since the bi-directional power converter 222 of the energy storage device 22 is controlled to perform an operation simulating the inertial force of the synchronous generator 231, the inertial force of the synchronous generator 231 can be compensated for. Therefore; it is possible to prevent the synchronous generator 231 from dropping out with respect to the fluctuation of the important load 30. As a result, it is possible to stably supply power to the important load 30 even at the time of a system abnormality.

Other Modified Embodiments

The disclosure is not limited to the above embodiment.

For example, although the system abnormality detection part of the above embodiment detects a voltage drop including an instantaneous voltage drop, it may also detect a system abnormality which is at least one of a frequency fluctuation, a voltage rise, a phase fluctuation; a voltage imbalance, a harmonic abnormality, and a flicker.

Further, the impedance element 4 may be a capacitor, or may be a combination of any of a reactor, a resistor, and a capacitor.

Further, although the energy storage part of the above embodiment is a storage battery such as a secondary battery, it may also be of a pumped-storage power generation type, a compressed-air storage type, a superconducting power storage type, a flywheel, an electric double-layer capacitor, or the like.

In addition, the disclosure is not limited to the above embodiment, and various modifications may be made without departing from the spirit of the disclosure.

INDUSTRIAL APPLICABILITY

According to the disclosure, while satisfying the FRT requirements, it is possible to provide a power supply system which stably supplies power to a load even at the time of a system abnormality.

What is claimed is:

1. A power supply system comprising:
   a distributed power supply connected to a power line for supplying power to an important load from a commercial power system;

an opening/closing switch provided on a commercial power system side of the distributed power supply on the power line;

an impedance element connected in parallel to the opening/closing switch on the power line;

a system abnormality detection part detecting an abnormality of the commercial power system; and a switch control part which opens the opening/closing switch and connects the distributed power supply and the commercial power system via the impedance element when an abnormality of the commercial power system is detected, wherein in a state where the distributed power supply and the commercial power system are connected via the impedance element, the distributed power supply continues an operation including a reverse power flow, and the distributed power supply comprises a rotary power generation device connected to the power line and an energy storage device connected to the power line, wherein the energy storage device comprises:

an energy storage part;

a bi-directional power converter performing charging and discharging of the energy storage part; and a converter control part controlling the bi-directional power converter to perform an operation simulating an inertial force of the rotary power generation device, wherein the converter control part determines to perform a droop control or a command value control on the bi-directional power converter in accordance with a detection result of the system abnormality detection part.

2. The power supply system according to claim 1, wherein the distributed power supply has a solar power generation device comprising a solar power generation panel and a power converter.

3. The power supply system according to claim 2, wherein the converter control part performs current control on the bi-directional power converter when the commercial power system is normal, and performs voltage control on the bi-directional power converter when the commercial power system is abnormal.

4. The power supply system according to claim 2, wherein the converter control part constantly performs voltage control on the bi-directional power converter.

5. The power supply system according to claim 1, wherein the converter control part performs current control on the bi-directional power converter when the commercial power system is normal, and performs voltage control on the bi-directional power converter when the commercial power system is abnormal.

6. The power supply system according to claim 1, wherein the converter control part constantly performs voltage control on the bi-directional power converter.

* * * * *